May 14, 1957      S. R. CROCKETT      2,791,933
MAGNETIC CLUTCH CAMERA
Filed June 13, 1952
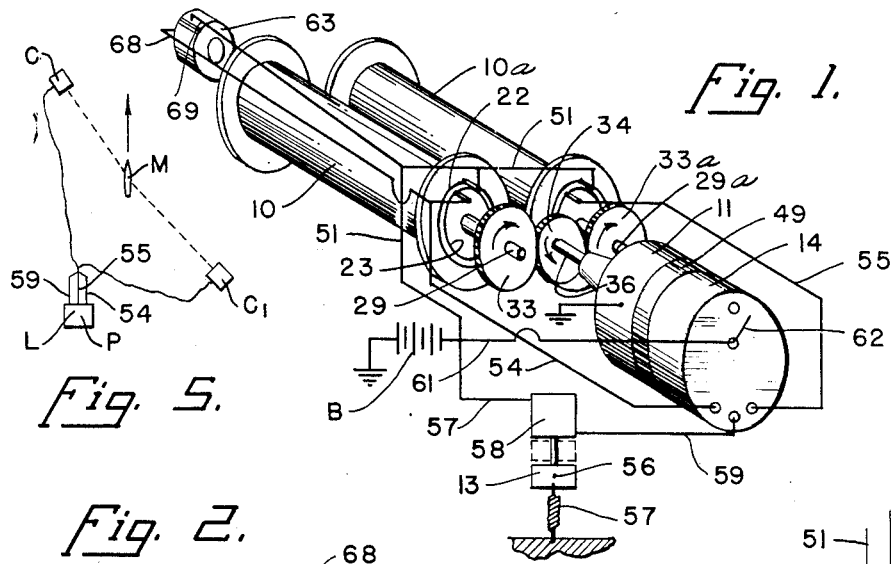
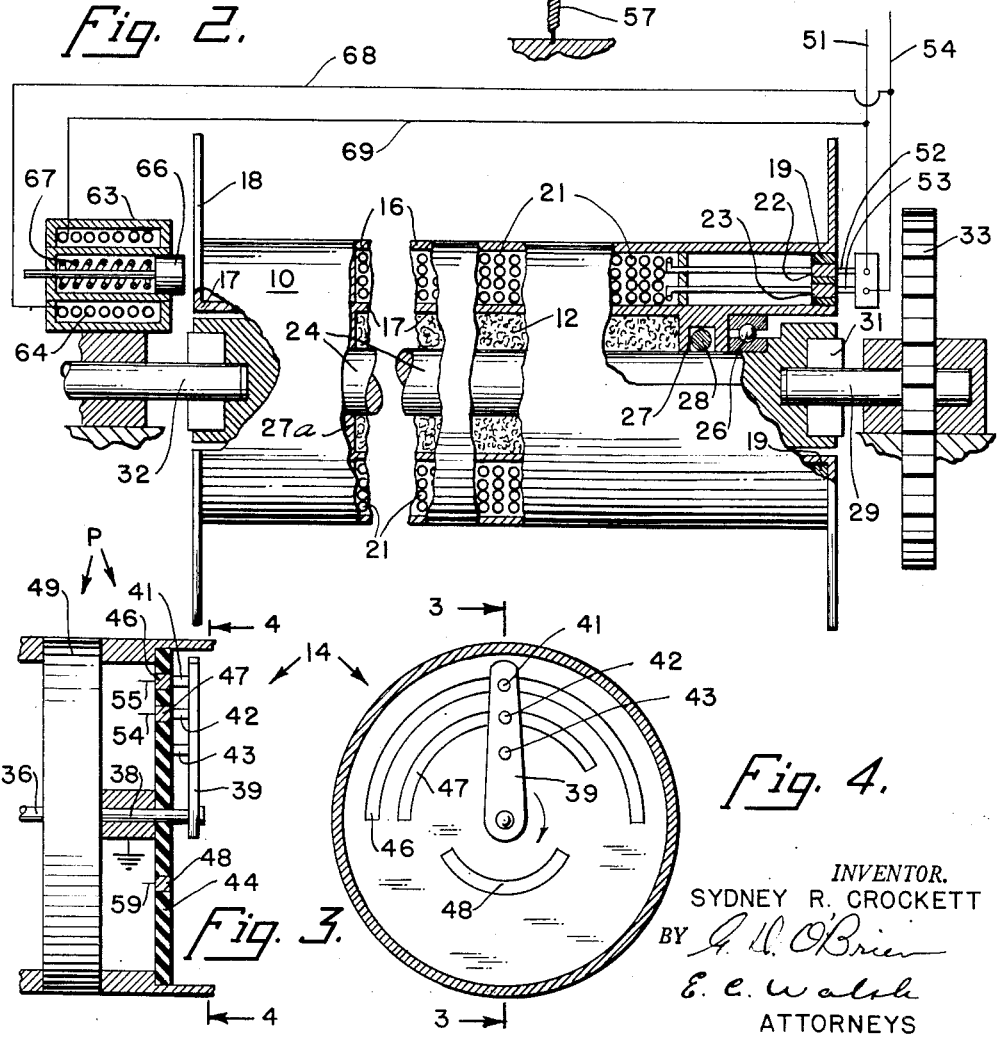
INVENTOR.
SYDNEY R. CROCKETT
ATTORNEYS United States Patent Office 2,791,933
Patented May 14, 1957

2,791,933

MAGNETIC CLUTCH CAMERA

Sydney R. Crockett, Inyokern, Calif.

Application June 13, 1952, Serial No. 293,497

4 Claims. (Cl. 88—16)

(Granted under Title 35, U. S. Code (1952), sec. 266)

The invention described herein may be manufactured and used by or for the Government of the United States of America for governmental purposes without the payment of any royalties thereon or therefor.

This invention relates to film machines, such as motion picture cameras, and more particularly to improvements in film spool driving apparatus for same.

In film machines of the type wherein film is intermittently fed between feed and take-up spools it is common practice to employ gear trains, mechanical clutches, cams and other complicated mechanisms which not only add to the initial cost of such machines, but also add to their cost of maintenance due to the necessity of lubrication, making delicate adjustments, replacement of worn parts, etc.; moreover, if a timing sequence of operation of the various parts is desired, which is different than the designed sequence, various parts of the mechanism must be replaced with specially constructed parts.

One of the objects of this invention is to provide a simplified intermittent film spool driving mechanism.

Another object is to provide a film spool with a self contained electrically controlled clutch.

Another object is to provide an electrical program switch for the clutch which may form a part of the camera or be located remotely therefrom.

Another object is to control the operation of a plurality of cameras with a remote program switch.

Other objects and many of the attendant advantages of this invention will be readily appreciated as the same becomes better understood by reference to the following detailed description when considered in connection with the accompanying drawings wherein:

Fig. 1 is an isometric view of the principal components of the invention and an electrical circuit which may be employed therewith;

Fig. 2 is an enlarged fragmentary side elevation of one of the spools of Fig. 1, portions being broken away;

Fig. 3 is a side elevation of a program switch, portions being shown in section on line 3—3, Fig. 4;

Fig. 4 is a section on line 4—4, Fig. 3; and

Fig. 5 is a diagrammatic illustration of one of the adaptations of the invention.

Referring in detail to the drawing, the invention comprises in general, a film feed spool 10, a film take-up spool 10a, a motor 11 for intermittently rotating the spools through a clutch 12 disposed in each spool, a shutter 13, and a program switch 14 for controlling the sequence or program operation of the clutches and shutter.

Spools 10, 10a are each formed of two concentric tubes 16, 17 which may be of magnetic material secured together at one end by flange 18 and at the other end by an insulating ring 19. The annular space between these tubes contains a coil 21 of insulated wire, the ends of which are connected to concentric slip rings 22, 23 carried by ring 19. A shaft 24 of magnetic material is disposed axially of the spool and rotatably supported therein by a bearing 26 disposed adjacent one end thereof. A similar bearing (not shown) is disposed between the shaft and spool adjacent the other end of the latter. The annular space between the shaft and inside surface of tube 17 is closed at opposite ends thereof by walls 27, 27a, each of which is sealed to the shaft by an O ring 28. The annular space just described is filled with Carbonyle iron powder. When a direct current flows through coil 21 a magnetic field is established through the powder which causes it to solidify and lock the spool and shaft together for conjoint rotation. When the coil is deenergized the powder is in a fluid state and permits the shaft to rotate within the now stationary spool.

Shaft 24 is supported and driven at one end thereof by shaft 29 having a key 31 which engages in a cross slot in one end of shaft 24. The other end of the shaft 24 is similarly supported by a shaft 32. Shaft 29 of the feed spool mechanism is provided with a gear 33, and shaft 29a of the take-up spool mechanism is provided with a similar gear 33a, these gears meshing with a driving gear 34 connected to rotatable shaft 36 of motor 11.

Program controller 14 comprises a rotatable shaft 38 which carries an arm 39 having grounding brushes 41, 42, 43 thereon which wipe around an insulated disk 44 having electrical contact segments 46, 47, 48, respectively. As illustrated, shaft 38 is driven by motor shaft 36 through a suitable speed changer 49. If it be desired to operate the controller at a situs remote from the camera a suitable motor such as a variable speed motor may be substituted for speed changer 49.

Assuming that controller arm 39 is in the position shown in Figs. 3 and 4, current from battery B flows through wire 51, brush 52, slip ring 22, through coil 21 to slip ring 23, brush 53, wire 54, segment 47, brush 42, arm 39, and shaft 38 to ground. The coil in spool 10a is simultaneously energized by wire 51, similar slip rings and brushes associated with spool 10a, wire 55, segment 46, brush 41, arm 39, and shaft 38 to ground. Both spools are now rotating feeding film from spool 10 to spool 10a across the focal plane of the camera. Shutter 13, in the optical axis 56 of the camera, is maintained closed by spring 57. When arm 39 moves to a position wherein brushes 41, 42 are out of contact with segments 46, 47 and brush 43 is in contact with segment 48, current flows through wire 57, solenoid 58 which opens the shutter, wire 59, segment 48, brush 43, arm 39 and shaft 38 to ground. Flow of current to motor 11 is established through wire 61 and switch 62.

To prevent overtravel of the spools due to inertia effects after the clutch actuating coils have been deenergized, an electric braking device may be employed which is illustrated as a solenoid 63 having a coil 64, and a plunger 66 actuated to braking position against flange 18 by a spring 67. This coil is energized by wire 68 connected to wire 54, and wire 69 connected to wire 51, when the clutches are engaged, to thus move the plunger away from engagement with flange 18.

The film may be maintained under tension while the shutter is open by constructing the segments 46, 47 in such manner that contact is broken on segment 47 before contact is broken on segment 46. Thus, spool 10 will stop while the clutch in spool 10a is still engaged and continued rotation of spool 10a and its inertia effect, after its clutch is disengaged will maintain the film under tension during the brief interval that the shutter is open. This feature is not essential to the invention, however, and it will be understood that it may be omitted if desired. Similarly, the braking device may be omitted when spool overtravel would not be objectionable. Any suitable drag devices may be employed in lieu of the brake to produce a frictional drag on one or both of the spools to stop rotation thereof when the clutches are deenergized.

Since the details of the manner in which the film is fed through the focal plane of the machine and across the optical axis of the shutter form no part of the invention per se, they have been omitted to simplify the disclosure inasmuch as they are well understood in the art.

It will now become apparent that the program of operation of the various parts may be readily altered as desired without complicated changes in mechanism by merely choosing an appropriate program disk. As one example of the use of the invention, as illustrated in Fig. 5, it will be assumed that a plurality of cameras C, C₁ are disposed at different loci and are focused on a moving object M, which is to be photographed from different directions. A single program switch P, having a variable speed motor in lieu of speed changer 49, will be disposed at locus L. Wires 54, 55 and 59 will connect with the clutches of the cameras and the shutters thereof so that exposures of all cameras are synchronized. Switch 62 may also be disposed at locus L to control operation of all camera motors. If it now be desired to change the synchronized camera programs this may be attained by variation of speed of rotation of the program driving motor and/or change of the program switch, the electrical contacts thereon being constructed for the particular camera operation desired.

Obviously many modifications and variations of the present invention are possible in the light of the above teachings. It is therefore to be understood that within the scope of the appended claims the invention may be practiced otherwise than as specifically described.

I claim:

1. A film machine comprising a film feed spool, drive means including releasable magnetic clutch means attached to said feed spool to rotate said feed spool, a film take-up spool, drive means including releasable magnetic clutch means attached to said take-up spool to rotate said take-up spool, means to continuously operate said two drive means, an electrically actuated shutter, a rotary program switch electrically connected to a source of power and to said two magnetic clutch means and to said shutter, said switch having contact sectors thereon adapted to operate said clutches and said shutter in a sequential cycle in which, with the shutter closed both magnetic clutches are engaged to feed film, and in which the feed spool clutch is first released, the take-up spool is subsequently released, and the shutter opened and then shut preparatory to the start of another cycle, and means to rotate said rotary program switch.

2. Apparatus in accordance with claim 1 wherein said film machine is a camera, a second camera having film spools, spool driving means with magnetic clutches and shutter means all similar to those of said first camera, the two cameras being disposed at different loci, said rotary program switch being also in electrical connection with the magnetic clutches and shutter of said second camera and being disposed at a locus different from at least one of the cameras whereby the magnetic clutches and shutters of the two cameras may be simultaneously operated through said sequential cycle by said rotary program switch.

3. A film machine comprising a film feed spool, drive means including a releasable clutch mechanism attached to said feed spool to rotate said feed spool, a film take-up spool, drive means including a releasable clutch mechanism attached to said take-up spool to rotate said take-up spool, means to continuously operate said two drive means, a brake mechanism, clutch operating means connected to said two clutch mechanisms to cause them to be operated in a sequence in which both are simultaneously caused to drivingly engage their respective spools at the start of a winding operation and to release said feed spool before release of said take-up spool causing the film to be held taut between the spools at the end of a winding operation, said brake mechanism being positioned adjacent said feed spool to normally contact said spool to inhibit its rotation, actuating means for said brake mechanism, said actuating means being connected to said clutch operating means in such a manner that when said clutch operating means are in engagement to drive said two spools the brake mechanism is actuated to be held out of contact with said feed spool to allow further rotation thereof.

4. A film machine comprising a film feed spool, drive means including a releasable clutch mechanism attached to said feed spool to rotate said feed spool, a film take-up spool, drive means including a releasable clutch mechanism attached to said take-up spool to rotate said take-up spool, means to continuously operate said two drive means, clutch operating means connected to said two clutch mechanisms to cause them to be operated in a sequence in which both are simultaneously caused to drivingly engage their respective spools at the start of a winding operation and to release said feed spool before release of said take-up spool causing the film to be held taut between the spools at the end of a winding operation, said two clutch mechanisms being magnetic clutches and said operating means connected to said clutch mechanisms being an electric circuit including a program switch for operating said magnetic clutches in said sequence, said film machine having also a solenoid retracted spring biased brake mechanism positioned adjacent said feed spool and normally pressed thereagainst to inhibit rotation of said feed spool, said solenoid being electrically connected to said electric circuit controlling said magnetic clutches so that operation of said clutches to drive said spools will cause release of said feed spool by said brake mechanism.

References Cited in the file of this patent

UNITED STATES PATENTS

| 1,708,521 | Proska | Apr. 9, 1929 |
| 1,846,571 | Rochestie et al. | Feb. 23, 1932 |
| 1,869,965 | Horowitz | Aug. 2, 1932 |
| 1,888,094 | Ranieri | Nov. 15, 1932 |
| 1,948,319 | Spence | Feb. 20, 1934 |
| 1,950,091 | Owens | Mar. 6, 1934 |
| 2,040,244 | Ceccarini | May 12, 1936 |
| 2,320,434 | Holcomb | June 1, 1943 |
| 2,575,360 | Rabinow | Nov. 20, 1951 |
| 2,645,169 | Hayward et al. | July 14, 1953 |
| 2,653,508 | Whiteley | Sept. 19, 1953 |

FOREIGN PATENTS

| 352,232 | Germany | Apr. 24, 1922 |
| 581,383 | Great Britain | Oct. 10, 1946 |
| 982,025 | France | Jan. 24, 1951 |